Aug. 5, 1941.   R. M. WAREHAM   2,251,433
CAP MAKING APPARATUS
Filed April 26, 1938   2 Sheets-Sheet 1
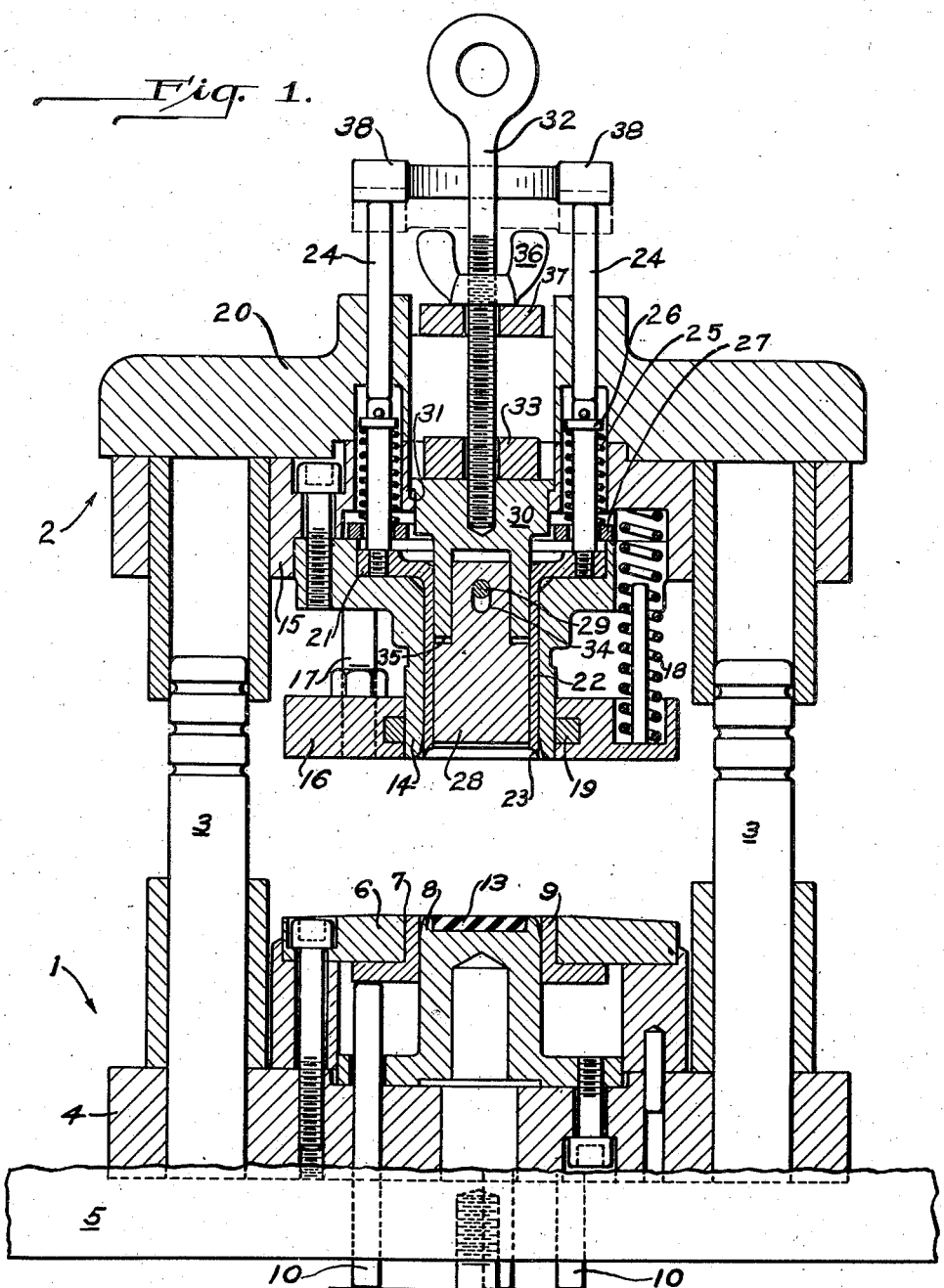
INVENTOR.
ROY M. WAREHAM
BY
S. Ernest Low.
ATTORNEY.

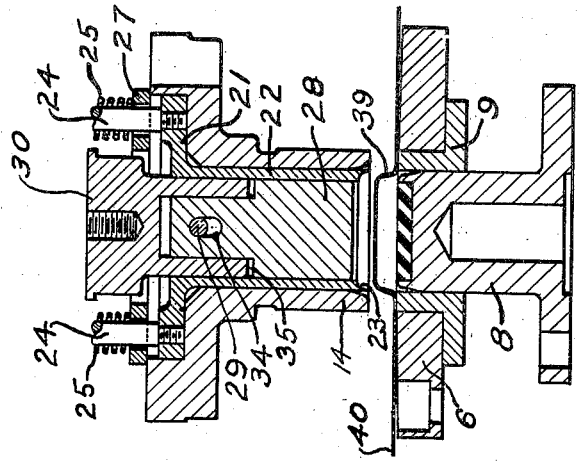
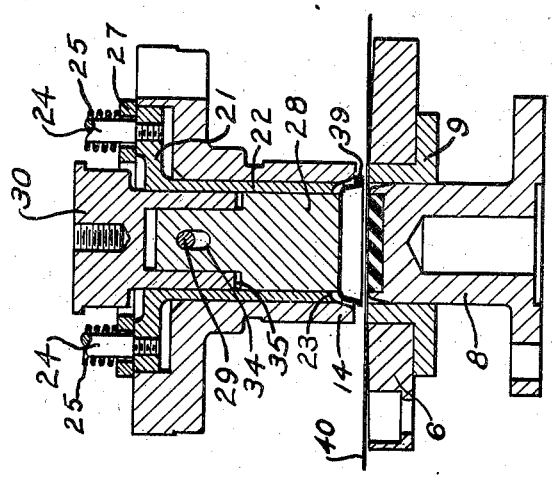
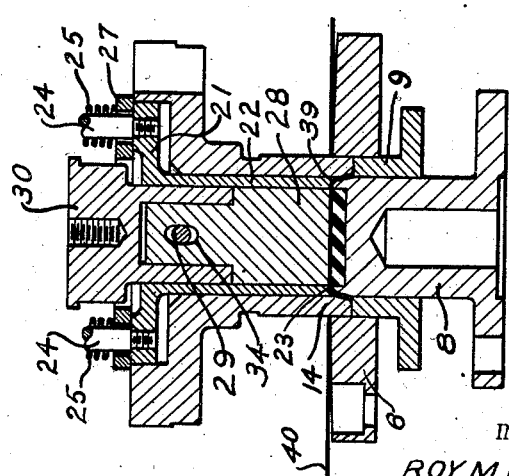

Patented Aug. 5, 1941

2,251,433

UNITED STATES PATENT OFFICE 2,251,433

CAP MAKING APPARATUS

Roy M. Wareham, New Kensington, Pa., assignor to Aluminum Company of America, Pittsburgh, Pa., a corporation of Pennsylvania Application April 26, 1938, Serial No. 204,483

3 Claims. (Cl. 113—42)

This invention relates to apparatus for making container caps and the like from sheet material, and relates particularly to apparatus for making and embossing caps of relatively thin pliable material such as metal foil.

An object of this invention is to provide a structure for making container caps and suitably embossing them, said structure being provided with automatic means for disengaging the finished cap from the structure. A further object of this invention is to provide a cap-making and embossing structure having knock-out means adapted to assist in forming the finished cap, as well as to remove the cap from the embossing means. An additional object of this invention is to provide a cap-making and embossing structure having knock-out means initially retracted from a cap adhering to the embossing surface and subsequently re-engaging the cap to strip it from the embossing surface. A further object of this invention is to provide a method for making and embossing container caps which will insure removal of the cap from the cap-forming and embossing means. Other objects of the invention will be apparent from the following description and claims.

The novel features of the invention are disclosed in the following specification and claims, and in the accompanying drawings, in which:

Fig. 1 is a view, substantially in section, of a cap-forming structure embodying my invention;

Fig. 2 is a vertical sectional view of the structure shown in Fig. 1, with the several parts in cap-forming relation;

Fig. 3 is a sectional view similar to Fig. 2, but showing a later stage in the operation of the apparatus, and before disengagement of the formed and embossed cap; and Fig. 4 is a sectional view similar to Fig. 2, but showing the cap knock-out means in fully extended position.

Referring to Fig. 1 of the drawings, the cap-forming apparatus shown comprises two separable units, identified generally by the reference numerals 1 and 2, which are held in proper registration by the guides 3 mounted in the support 4 which is attached to the platen 5. A die plate 6 is secured to the support 4, and is provided with a cutting edge 7 defining a die mouth into which extends a back-up member 8 fastened to the support 4, and a draw ring 9. The draw ring 9 is resiliently supported by the posts 10 and the spring-supported plate 11 which is slidably mounted on the spring-loaded rod 12. The back-up member 8 carries a resilient pad 13, preferably of rubber, which provides a yielding surface for the embossing plunger hereinafter described.

The upper portion of the apparatus, generally indicated by the reference numeral 2, consists principally of a punch, knock-out, and embossing plunger assembly, and means for mounting and operating the same. The punch 14 thereof is attached to a punch holder 15 with its lower portion in alignment with the die mouth and extending into a central aperture in the clamping plate 16. The clamping plate 16 is suspended from the upper portion of the die by the threaded bolt 17, and is reciprocable with respect to the punch and the punch holder 15 by virtue of the action of the springs 18 seated in aligned recesses in the clamping plate and the punch holder. The packing 19 serves to lubricate the punch 14 which in turn provides lubrication for the die mouth. The punch holder 15 is attached by suitable means to a cap plate 20 having an aperture therein aligned with a centrally located aperture in the punch holder. The interior of the punch 14 forms a continuation of the aligned apertures of the cap plate 20 and the punch holder 15.

The upper portion of the punch 14 is counterbored to receive the flange 21 of the ejector 22 which is concentrically positioned within the punch, and is reciprocable axially with respect thereto to a limited extent by reason of the thickness of the flange 21 being less than the depth of the punch counterbore receiving it. The lower edge 23 of the ejector 22 is curved for a purpose to be explained later. The pins 24, made in two parts for ease in assembly, are threaded into the flange 21, and are encircled by the coil springs 25 positioned between the washers 26 and an annular plate 27 supported on the upper surface of the punch 14. The plate 27 is provided with apertures through which the pins 24 are free to move with respect to the plate 27. It will be seen that the described spring arrangement exerts an upward pressure on the washers 26, and consequently normally serves to hold the ejector flange 21 against the under side of the plate 27. If desired, suitable back-up springs may be seated on the plate 27 to hold the plate down against the upper surface of the punch 14.

Concentrically located within the ejector 22 is a plunger 28 slidably mounted on a transverse pin 29 in the plunger holder 30. The lower end of the plunger 28 may be provided with an embossing surface so that the plunger is in itself an embossing die, or it may be so made that it accommodates removable embossing dies attached to its lower end. The flanged head of the plunger holder 30 rests on a seat 31 in the central aperture in the punch holder 15, and an eye bolt 32 threaded into the said head serves as a handle for lifting the plunger assembly from the apparatus when it is desired to do so. A bifurcated key 33 is slidable in a key way formed in the punch holder 15 and the cap plate 20, and when in position extends across the central apertures in the punch holder and the cap plate, thus serving to hold the plunger assembly in place. The pin 29 extends through a slot 34 in the upper portion of the plunger 28 and supports the plunger during a portion of the cycle of operation of the apparatus, as will be hereinafter explained. The slot 34 permits relative movement between the plunger 28 and its holder 30 for a distance determined by the upper end of the slot and the abutment surface 35 of the plunger holder.

The plunger assembly is introduced into the apparatus through the central aperture in the cap plate 20, after which the key 33 is slid in place over the head of the plunger holder 30 and the wing nut 36 on the eye bolt 32 is screwed down on the lock plate 37. Above the pins 24 are the vertically movable stops 38 which contact the pins 24 under certain conditions to be described later. The stops are shown as parts of a yoke which is connected to the body of the machine (not shown). Any suitable means, such as are well-known in the art, may be used for lowering and raising the upper portion 2 of the machine.

Figs. 2-4 illustrate the operation of the above described apparatus in forming a bottle cap 39, and in ejecting the cap. After suitable sheet material 40, such as a thin sheet of aluminum, has been positioned over the mouth of the die plate 6, the punch 14 and its associated parts are moved downward to the position shown in Fig. 2. During this downward movement the punch 14, in conjunction with the cutting edge 7 of the die plate 6, shears a blank which the punch and the lower edge 23 of the ejector 22 by continued downward movement form into a shallow cup-like cap against the rounded edge of the back-up member 8 as the draw ring 9 is forced downward by the punch 14. It will be seen that the plunger 28 is, before the completion of the downward stroke, pushed upward against the abutment surface 35 of the plunger holder 30, after which the plunger holds and presses the cap 39 against the resilient pad 13 during the final stages of the forming operation, and embosses the cap if the lower face of the plunger is provided with embossing configurations.

As the return stroke of the portion 2 of the apparatus is begun, and the downward pressure of the punch 14 is released, the draw ring 9 moves upward and forces the cap 39 from the back-up member 8. However, it frequently happens in cap-forming machines that the cap sticks to the plunger 28, as shown in Fig. 3. A primary object of this invention is to overcome such an occurrence, and to insure removal of the cap from the punching apparatus before the machine begins its next punching operation. It will be appreciated that the machine operates very rapidly, and that in order to insure its proper and efficient operation it is necessary that each cap formed be removed from the apparatus before an attempt is made to form another cap.

As the upper portion 2 of the machine moves upward, the punch 14 and the ejector 22 are retracted before the plunger 28 because of the movement of the transverse pin 29 in the slot 34 necessary before the plunger can move upward. Consequently, the lower edge 23 of the ejector 22 and the shearing edge of the punch 14 are positively disengaged from the cap 39 before the plunger begins its upward movement. As the upper portion 2 continues to move upward, the plunger 28 is withdrawn from the back-up member 8 to a suspended position on the pin 29, after which the pins 24 strike the stops 38 (Fig. 1) and the upward movement of the ejector 22 is arrested. The stops 38 are vertically movable, but their movement upward is opposed by suitable resilient means (not shown) providing greater compressive resistance than the springs 25, so that continued upward movement of the upper portion 2 produces relative movement between the plunger 28 and the ejector 22 until the ejector flange 21 contacts the bottom of the counterbore in the punch 14. This movement, since the distance the plunger 28 is capable of moving with respect to its holder 30 is less than the distance the ejector flange 21 can move in the counterbore of the punch 14, is sufficient to cause the lower edge 23 of the ejector to project below the bottom face of the plunger, with the result that the cap is positively disengaged from the plunger. Thereafter the stops 38 must yield until the upper die portion 2 reaches the top of its stroke. Obviously, during the downward stroke the springs 25 lift the ejector 22 until its flange 21 bears against the plate 27 as soon as the pins 24 are disengaged from the stops 38.

It will be understood that various modifications can be made in machines such as have been described above without departing from the spirit of my invention and from the scope of the appended claims.

I claim:

1. In cap-making apparatus, a reciprocable punch assembly including a punch, an ejector, a plunger, and a support for said plunger, said punch, said ejector, and said plunger being axially movable relative to each other, in combination with means for arresting retraction of said ejector during retraction of said punch assembly, said punch, said ejector, and said plunger providing adjoining cap-forming surfaces at the completion of the forming stroke of said assembly, said plunger and said plunger support having a lost motion connection whereby in the retraction of said punch assembly initial axial retraction of said punch and said ejector relative to said plunger precedes retraction of said plunger until the lost motion effect of said connection is overcome, whereupon retraction of said plunger occurs past the uppermost portion of the cap-forming surface of said ejector following retardation of the retraction of said ejector by said arresting means, which operation of said punch assembly first removes said punch and said ejector from contact with the formed cap, and thereafter brings said ejector into a position relative to said plunger in which the ejector is adapted to strip from said plunger a formed cap adhering thereto.

2. In cap-making apparatus, a reciprocable punch assembly including a punch, an ejector disposed within said punch, a plunger supported within said ejector, a support for said plunger, and resilient means for supporting said ejector permitting movement of the ejector relative to said punch and said plunger, said punch, said ejector, and said plunger being axially movable relative to each other, in combination with means cooperating with said supporting means for arresting retraction of said ejector during retraction of said punch assembly, said punch, said ejector, and said plunger providing adjoining cap-forming surfaces at the cap-forming surfaces at the completion of the forming stroke of said assembly, said plunger and said plunger support having a lost motion connection whereby in the retraction of said punch assembly initial axial retraction of said punch and said ejector relative to said plunger precedes retraction of said plunger until the lost motion effect of said connection is overcome, whereupon retraction of said plunger occurs past the uppermost portion of the cap-forming surface of said ejector following retardation of the retraction of said ejector by said arresting means, which operation of said punch assembly first removes said punch and said ejector from contact with the formed cap, and thereafter brings said ejector into a position relative to said plunger in which the ejector is adapted to strip from said plunger a formed cap adhering thereto.

3. In cap-making apparatus, a reciprocable punch assembly including a punch, an ejector disposed within said punch, a plunger disposed within said ejector, and a support for said plunger, said punch, said ejector, and said plunger being axially movable relative to each other, in combination with means for arresting retraction of said ejector during retraction of said punch assembly, said punch, said ejector, and said plunger providing adjoining cap-forming surfaces at the completion of the forming stroke of said assembly, said plunger and said plunger support having a lost motion connection whereby in the retraction of said punch assembly initial axial retraction of said punch and said ejector relative to said plunger precedes retraction of said plunger until the lost motion effect of said connection is overcome, whereupon retraction of said plunger occurs past the uppermost portion of the cap-forming surface of said ejector following retardation of the retraction of said ejector by said arresting means, which operation of said punch assembly first removes said punch and said ejector from contact with the formed cap, and thereafter brings said ejector into a position relative to said plunger in which the ejector is adapted to strip from said plunger a formed cap adhering thereto.

ROY M. WAREHAM.